(12) United States Patent
Björkman et al.

(10) Patent No.: US 11,975,931 B2
(45) Date of Patent: May 7, 2024

(54) METHOD FOR MOVING A HEAVY OBJECT

(71) Applicant: Volvo Truck Corporation, Gothenburg (SE)

(72) Inventors: Gunnar Björkman, Gothenburg (SE); Viktor Karlsson, Mölndal (SE)

(73) Assignee: Volvo Truck Corporation, Gothenburg (SE)

( * ) Notice: Subject to any disclaimer, the term of this patent is extended or adjusted under 35 U.S.C. 154(b) by 182 days.

(21) Appl. No.: 17/487,367

(22) Filed: Sep. 28, 2021

(65) Prior Publication Data

US 2022/0106124 A1   Apr. 7, 2022

(30) Foreign Application Priority Data

Oct. 6, 2020 (EP) ..................................... 20200341

(51) Int. Cl.
*B65G 7/06* (2006.01)
*B60P 1/60* (2006.01)
*B60V 1/04* (2006.01)

(52) U.S. Cl.
CPC .................. *B65G 7/06* (2013.01); *B60P 1/60* (2013.01); *B60V 1/04* (2013.01)

(58) Field of Classification Search
CPC ..... B65G 7/06; B60P 1/60; B60V 1/04; B66F 3/35
See application file for complete search history.

(56) References Cited

U.S. PATENT DOCUMENTS 3,726,357 A * 4/1973 Gaufillet ................ B60V 3/025
                                                        180/124
3,756,342 A * 9/1973 Burdick .................... B65G 7/06
                                                        180/128

(Continued)

FOREIGN PATENT DOCUMENTS

CN        101090858 A       12/2007
CN        207328135 U        5/2018

(Continued)

OTHER PUBLICATIONS

Extended European Search Report for European Patent Application No. 20200341.4, dated Feb. 16, 2021, 8 pages.

(Continued)

*Primary Examiner* — Minnah L Seoh
*Assistant Examiner* — Ryan Edward Hardy
(74) *Attorney, Agent, or Firm* — Withrow & Terranova, PLLC

(57) ABSTRACT

The present invention relates to a method for moving a heavy object into a confined space. The method comprises providing the heavy object in an initial position, the heavy object having an underside resting on a ground surface and comprising an inducible gas-cushion arrangement which in its inactive state causes the underside of the heavy object to maintain contact with the ground surface; activating the inducible gas-cushion arrangement by forming a gas cushion between the underside of the heavy object and the ground surface, the gas cushion generating a lifting force causing the underside of the heavy object to lose contact with the ground surface; moving the heavy object relative to the confined space until the underside of the heavy object at least levels with the supporting surface of the confined space; and moving the heavy object into its final position utilizing the lifting force of the gas-cushion.

13 Claims, 4 Drawing Sheets

(56) References Cited

U.S. PATENT DOCUMENTS

| | | | | |
|---|---|---|---|---|
| 4,087,895 | A * | 5/1978 | Etienne | B60L 50/66 |
| | | | | 254/93 HP |
| 5,508,597 | A * | 4/1996 | Parmley, Sr. | B60L 50/66 |
| | | | | 414/281 |
| 7,426,974 | B1 * | 9/2008 | Yeghiayan | B66F 3/35 |
| | | | | 180/128 |
| 11,198,518 | B1 * | 12/2021 | Knight | B64F 1/228 |
| 2005/0132490 | A1 * | 6/2005 | Davis | A61G 7/1021 |
| | | | | 5/81.1 R |
| 2019/0047833 | A1 * | 2/2019 | Lane | B66F 3/35 |

FOREIGN PATENT DOCUMENTS

| | | | | |
|---|---|---|---|---|
| CN | 108224864 | A | 6/2018 | |
| CN | 109572480 | A | 4/2019 | |
| CN | 210655961 | U | 6/2020 | |
| DE | 2849461 | A1 | 5/1980 | |
| DE | 19520361 | A1 | 12/1996 | |
| GB | 2027653 | A | 2/1980 | |
| WO | WO-9911555 | A1 * | 3/1999 | B29D 22/02 |
| WO | 2013104844 | A1 | 7/2013 | |

OTHER PUBLICATIONS

First Office Action for Chinese Patent Application No. 20211142029.X, mailed Jan. 10, 2024, 20 pages.

\* cited by examiner

METHOD FOR MOVING A HEAVY OBJECT

RELATED APPLICATIONS

The present application claims priority to European Patent Application No. 20200341.4, filed on Oct. 6, 2020, and entitled "METHOD FOR MOVING A HEAVY OBJECT," which is incorporated herein by reference in its entirety.

TECHNICAL FIELD

The present invention relates to a method for moving a heavy object, such as an energy storage or transformation device, into a confined space. The invention further relates to a heavy object in the form of an energy storage or transformation device comprising an inducible gas-cushion arrangement for facilitating movement of the heavy object into a confined space, and to a vehicle.

BACKGROUND

A vehicle typically comprises an engine for propelling the vehicle. The engine may be powered by various means, such as e.g. by a liquid or gaseous fuel in an internal combustion engine, or by electric power in an electric machine. Moreover, hybrid solutions exist in which the vehicle is propelled both by an internal combustion engine and an electric machine. In either way, energy storage or transformation devices are used to power the engine or electric machine. Moreover, fuel cells, together with a gas tank supplying a suitable gas to the fuel cell, may be used to propel the vehicle.

The energy storage or transformation devices, (e.g. batteries, gas tanks or fuel cells), for heavy commercial vehicles may have a weight of several hundred of kg and are therefor in need of special lifting equipment during assembly of the energy storage or transformation device to the vehicle, and during service workshops. Moreover, the energy storage or transformation devices are often associated with a specific installation position, e.g. attachment to the vehicle in a position where an interface comprising connectivity possibilities are available (e.g. electrical input/output). Such precise positioning of the energy storage or transformation devices further complicates the assembly and service, as the energy storage or transformation devices needs to be moved to, and from, the associated position.

In order to move the heavy energy storage or transformation devices, various lifting arrangements, or trucks, are often used. To prevent undesired motion of the heavy object, e.g. by damaging vital parts as the interface with connectivity possibilities, care must be taken during the movement. Precise control of the movement of the heavy object by the lifting arrangement or truck is difficult. Moreover, the lifting arrangements and trucks are associated with high costs.

Thus, there is a need in the industry for an improved method to move heavy objects, such as energy storage or transformation devices.

SUMMARY

It is an object of the present invention to at least partly alleviate the shortcomings discussed above in relation to known methods of moving heavy objects, and to improve a heavy object in the form of an energy storage or transformation device with regards to its mobility.

According to at least a first aspect of the present invention, a method for moving a heavy object, such as an energy storage or transformation device, into a confined space, the confined space being at least partly defined by a supporting surface for supporting the heavy objects in a final position, is provided. The method comprising:
providing the heavy object in an initial position, the heavy object having an underside resting on a ground surface and comprising an inducible gas-cushion arrangement which in its inactive state cause the underside of the heavy object to maintain contact with the ground surface;
activating the inducible gas-cushion arrangement by forming a gas cushion between the underside of the heavy object and the ground surface, the gas cushion generating a lifting force causing the underside of the heavy object to lose contact with the ground surface,
moving the heavy object relative the confined space until the underside of the heavy object at least levels with the supporting surface of the confined space, and
moving the heavy object into its final position in the confined space and onto the supporting surface of the confined space utilizing the lifting force of the gas-cushion.

Hereby, a method for facilitating movement of a heavy object is provided. Thus, the object of the present invention is at least achieved by the first aspect of the present invention. By utilizing the lifting force of the gas-cushion, the heavy object may be moved into the confined space, utilizing a smaller force compared to moving a heavy object without such inducible gas-cushion arrangement. In other words, the friction between the heavy object and the ground surface is reduced owing to the inducible gas-cushion arrangement, facilitating movement of the heavy object. Furthermore, by moving the heavy object using the gas-cushion, non-interacting transportation over smaller gaps and/or obstacles is possible. Moreover, by providing the heavy object with the inducible gas-cushion arrangement, the latter preferably being integrated into the heavy object which will be further described below, the heavy object can be moved into the confined space without the need to subsequently remove the inducible gas-cushion arrangement, which could be cumbersome. Moreover, the method may comprise moving the heavy object from its final position and out of the confined space utilizing the lifting force of the gas-cushion. Thus, assembly of the heavy object into the confined space, as well as removing the heavy object out from the confined space, e.g. due to service of the heavy object, are facilitated. Hereby, the use of lifting arrangements and trucks may be reduced, or even omitted.

It should be understood that the confined space may be a space which the heavy object snuggly fits into, e.g. by that the extension in at least one direction of the confined space is of the same magnitude as the corresponding extension of the heavy object (but obviously large enough to house the heavy object). For example, the height of the confined space may be of the same magnitude as the height of the heavy object. That is, the height of the confined space may be approximately the same as the height of the heavy object, e.g. 5%-50% higher than the height of the heavy object.

According to at least one example embodiment, the confined space is an inner housing space of a container, such as a box for housing energy storage or transformation devices in a vehicle. According to at least one example embodiment, the confined space is simply referred to as a space or inner housing space of a container.

According to at least one example embodiment, the inducible gas-cushion arrangement is arranged and configured to enable movement of the heavy object corresponding to that of a hovercraft. In other words, the inducible gas-cushion arrangement is arranged and configured to cause the heavy object to move as a hovercraft. Thus, gas, e.g. by means of blowers or blowing arrangements, produce a large volume of gas below the underside of the heavy object, i.e. the gas-cushion, at a pressure (slightly) above atmospheric pressure. The pressure difference between the gas-cushion and lower pressure of ambient air, produces the lifting force, which causes the underside of the heavy object to lose contact with the ground surface, or "float" above the ground surface. According to at least one example embodiment, the inducible gas-cushion arrangement comprises a skirt, typically a flexible skirt, which contains the gas-cushion.

According to at least one example embodiment, wherein moving the heavy object into its final position in the confined space comprises sliding the heavy object onto the supporting surface of the confined space utilizing the lifting force of the gas-cushion. Thus, the lifting force of the gas-cushion facilitates the movement of the heavy object in such a way that it can be slided from one surface to another surface.

According to at least one example embodiment, wherein moving the heavy object relative the confined space comprises vertically moving the heavy object from a first vertical position to a second vertical position.

Thus, the heavy object may be moved vertically to align the ground surface with the supporting surface of the confined space. Such vertical movement is typically carried out by a lifting arrangement, arranged and configured to vertically move the heavy object into various vertical positions or levels.

According to at least one example embodiment, the inducible gas-cushion arrangement is kept, or brought, into its inactivate state during vertically moving the heavy object from a first vertical position to a second vertical position.

Hereby, the heavy object can be stable during the vertical movement, as the underside of the heavy object rests on the ground surface. Thus, in the inactive state, the underside of the heavy object does not lose contact with the ground surface.

According to at least one example embodiment, wherein moving the heavy object into the confined space comprises horizontally moving the heavy object from a (e.g. a first or second) horizontal position to another (e.g. a second or third) horizontal position.

Hereby, the lifting force of the gas-cushion facilitates the horizontal movement as previously described. It should be understood that the vertical and horizontal direction may instead be referred to as directions in a Cartesian coordinate system (x, y, z-coordinates) originating from the heavy object. In such cases, the height of the heavy object extends in the z-direction, corresponding to the vertical direction, and the length and width of the heavy object extends in the x, y-plane, corresponding to the horizontal direction. Thus, a vertical movement is a movement in the z-direction, and a horizontal movement is a movement in the x, y-plane.

According to at least one example embodiment, the method comprises bringing the inducible gas-cushion arrangement to its inactive state subsequent to moving the heavy object into its final position in the confined space, thereby causing the underside of the heavy object to gain contact with the supporting surface in the confined space.

Hereby, the heavy object may be housed in the confined space in a stable manner. According to at least one example embodiment, the heavy object is assembled in the confined space.

According to at least one example embodiment, the inducible gas-cushion arrangement is arranged and configured to, when activated, form a plurality of separate gas-cushion segments, the method further comprising moving the heavy object over a gap whereby a sub-set of the separate gas-cushion segments maintains the overall lifting force induced by the inducible gas-cushion arrangement.

The sub-set of the separate gas-cushion segments meaning less than all of the separate gas-cushion segments. Thus, by the separate gas-cushion segments, the overall lifting force (i.e. the sum of the separated lifting forces caused by the separate gas-cushion segments) is enough to keep the underside of the heavy object above the ground surface or supporting surface, even if one or more of the separate gas-cushion segments is temporarily dysfunctional or not working (i.e. is "deflated"), e.g. by coinciding with a gap. Stated differently, by the plurality of separate gas-cushion segments, the heavy object may be moved, or slided, over a gap causing at least one gas-cushion segment to lose its induced lifting force, while the other gas-cushion segments provide for the overall lifting force enabling the underside of the heavy object to be kept above the ground surface or supporting surface.

The inducible gas-cushion arrangement may e.g. be arranged and configured to enable movement over a gap of the size between 1% and 40% of the extension of the heavy object (the extension e.g. being along a longitudinal axis of the heavy object, such as e.g. an axis in the x, y-plane of the heavy object), or between 1% and 30%, or between 1% and 20%, or between 1% and 10%, such as e.g. between 1% and 5% of the extension of the heavy object.

According to at least one example embodiment, the inducible gas-cushion arrangement is integrated in the heavy object, preferably by comprising a slot or cavity in the underside of the heavy object. However, alternatively, the inducible gas-cushion arrangement is a separate component to the heavy object, e.g. in the form of a platform onto which the heavy object may be arranged.

By integrating the inducible gas-cushion arrangement into the heavy object, the heavy object can easily be moved into the confined space, and out from the confined space, without any cumbersome activities related to removing the inducible gas-cushion arrangement.

According to a second aspect of the present invention, a heavy object in the form of an energy storage or transformation device is provided. The heavy object comprising:
  an underside configured to rest on a ground surface,
  an inducible gas-cushion arrangement arrangeable in an active state and an inactive state, wherein the inducible gas-cushion arrangement in its inactive state cause the underside of the heavy object to maintain contact with the ground surface; and in its active state forms a gas cushion between the underside of the heavy object and the ground surface, thus generating a lifting force causing the underside of the heavy object to lose contact with the ground surface.

Effects and features of the second aspect of the invention are largely analogous to those described above in connection with the first aspect of the invention, at least with regards to the inducible gas-cushion arrangement and its advantageous effects. Embodiments mentioned in relation to the first aspect of the invention, at least with regards to the inducible gas-cushion arrangement, are largely compatible with the second aspect of the invention, of which some are exemplified below. Hereby, a heavy object in the form of an energy storage or transformation device which is improved with regards to its mobility is provided. Thus, the object of the present invention is at least achieved by the second aspect of the present invention According to at least one example embodiment, the inducible gas-cushion arrangement is arranged and configured to, in its active state, form a plurality of separate gas-cushion segments.

Thus, as previously described, the heavy object may be moved over a gap without losing the overall lifting force, as described with reference to the first aspect of the invention.

According to at least one example embodiment, the heavy object comprises at least a front side and a back side arranged along a longitudinal axis of the heavy object (i.e. in the x, y-plane as described with reference to the first aspect of the invention), and comprising an interface having connectively possibilities integrated in the front side and/or back side, wherein the inducible gas-cushion arrangement is arranged and configured to, in its active state, enable movement of the heavy object in a direction along the longitudinal axis.

Thus, the heavy object may be arranged in the confined space in a desired manner with regards to the positioning of the interface. The heavy object may e.g. have a rectangular shape, or be box-shaped.

According to at least one example embodiment, wherein the separate gas-cushion segments, when the inducible gas-cushion arrangement is in its active state, are arranged in a parallel configuration along the longitudinal axis of the heavy object.

Thus, when bridging a gap being perpendicular to the longitudinal axis of the heavy object, the separate gas-cushion segments will encounter the gap successively. Hereby, the separate gas-cushion segments may be sequentially temporarily inoperable as the supplied gas will enter the gap instead of forming the gas-cushion, while the separate gas-cushions temporarily not coinciding with the gap can maintained the overall lifting force of the heavy object, as described with reference to the first aspect of the invention.

According to at least one example embodiment, the inducible gas-cushion arrangement is integrated in the heavy object, preferably by comprising a slot or cavity in the underside of the heavy object.

By integrating the inducible gas-cushion arrangement into the heavy object, the heavy object can easily be moved into the confined space, and out from the confined space, without any cumbersome activities related to removing the inducible gas-cushion arrangement. According to at least one example embodiment, the slot or cavity in the underside of the heavy object, is comprised in the inducible gas-cushion arrangement. This provides for a simple but yet effective means of integrating the inducible gas-cushion arrangement into the heavy object. Stated differently, the inducible gas-cushion arrangement comprises an indentation of an outer casing of the heavy object, the indentation forming a slot or cavity extending from the underside of the heavy object inwards towards the heavy object.

According to at least one example embodiment, the inducible gas-cushion arrangement comprises a plurality of slots in the underside of the heavy object (or corresponding indentations of the outer casing of the heavy object), each slot being arranged and configured to form a separate gas-cushion segment (i.e. the separate gas-cushion segments previously described). Thus, according to at least one example embodiment, the plurality of slots is arranged in a parallel configuration along the longitudinal axis of the heavy object. Hereby, the heavy object may bridge a gap.

According to at least one example embodiment, the inducible gas-cushion arrangement comprises an inlet connection connectable to a gas supply, and a conduit system configured to transfer gas from the gas supply and the inlet connection to the slot or plurality of slots.

According to at least a third aspect of the invention, a vehicle is provided. The vehicle comprises a plurality of heavy objects in the form energy storage or transformation devices according to the second aspect of the invention, and a container for housing the energy storage or transformation devices.

According to at least one example embodiment, the energy storage or transformation devices are batteries, fuel tanks and/or fuel cells.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
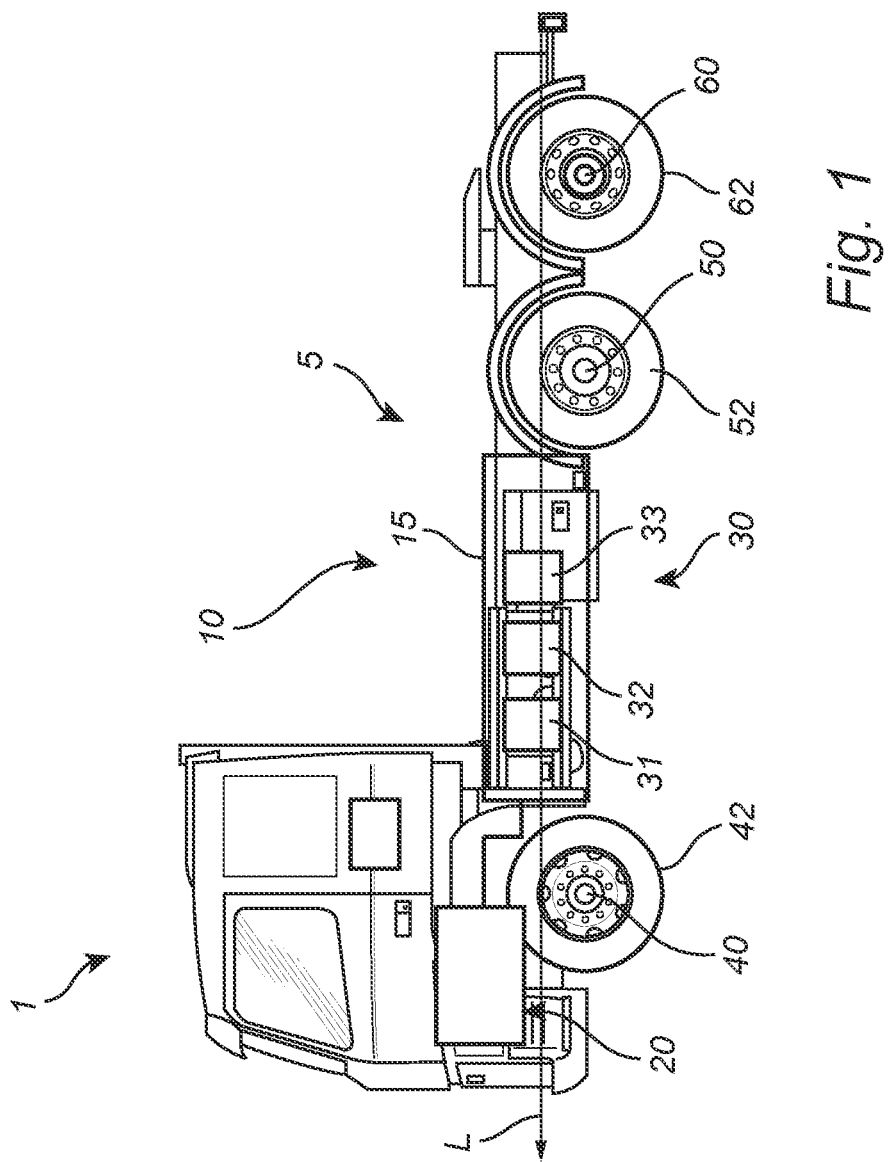
FIG. 1 is a side schematic view of a vehicle comprising a container housing a plurality of heavy objects in the form of energy storage or transformation devices in accordance with an example embodiment of the invention.

With reference to FIG. 1 a vehicle 1, here embodied as a heavy duty truck 1, is disclosed for which a heavy object in the form of an energy storage or transformation device 30 of a kind disclosed in the present disclosure is advantageous. However, the energy storage or transformation device 30 may as well be implemented in other types of vehicles, such as in busses, light-weight trucks, passenger cars, marine applications etc. The vehicle 1 may be an electric vehicle 1, such as a full electric vehicle or a hybrid, comprising a plurality of energy storage or transformation devices 31, 32, 33, e.g. batteries or fuel cells, supplying an electric machine or engine 20 with energy. Thus, in the example electric vehicle 1 of FIG. 1, the motor or engine 20 may be an electric machine 20, powered by the energy storage or transformation devices 30 in the form of batteries 31, 32, 33. The batteries 30 may be charged using an electric cable, or may be wirelessly charged using a wireless charging device, connected to an electrical energy source, e.g. a power grid. The vehicle in FIG. 1 further comprises a first axle 40, a second axle 50 and a third axle 60 arranged separated along a longitudinal direction L of the vehicle 1. The first axle 40 is in FIG. 1 a front axle 40, preferably a drive axle 40, comprising propulsion means 42 embodied as front wheels 42. The second axle 50 is a first rear axle 50, which may or may not be a drive axle, comprising propulsion means 52 embodied as first rear wheels 52, and the third axle 60 is a second rear axle 60, which may or may not be a drive axle, comprising propulsion means 62 embodied as second rear wheels 62.

Moreover, the vehicle 1 of FIG. 1 comprises a vehicle main supporting structure 5, which may comprise a vehicle supporting frame or chassis, to which components of the vehicle 1 are supported and attached. Between the first axle 40 and the second axle 50, the vehicle main supporting structure 5 forms a wheelbase structure 10. The wheelbase structure 10 comprises a container or compartment 15, in the form of a box 15, comprising a confined space for housing the energy storage or transformation devices 30.

Figure 2A:
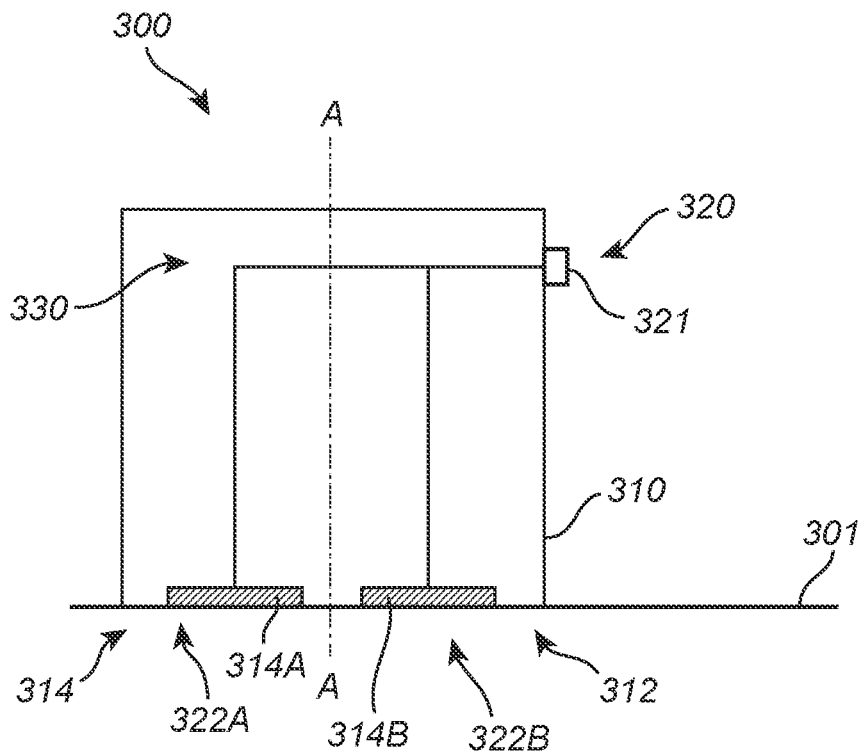
FIGS. 2A-2B are different schematic side views of a heavy object comprising an inducible gas-cushion arrangement in accordance with an example embodiment of the invention.
Figure 2B:
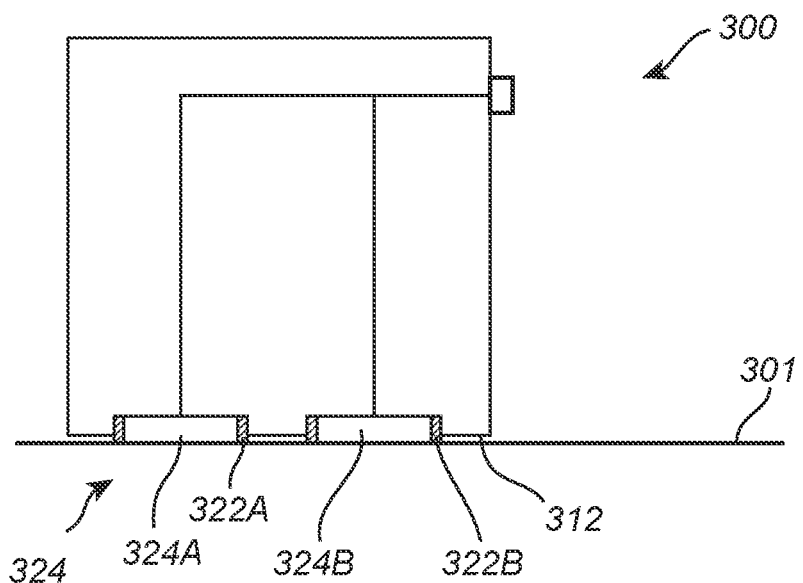

FIGS. 2A-2B disclose an example energy storage or transformation device 300, e.g. a battery, a gas tank or a fuel cell. The energy storage or transformation device 300 comprises an outer casing 310 having an underside 312, which in FIG. 2A, rests on a ground surface 301. In the underside 312 of the energy storage or transformation device 300, slots 314 or cavities 314, are formed. Thus, in other words, the outer casing 310 comprises indentations 314 (slots 314 or cavities 314) extending from the underside 312 inwards the energy storage or transformation device 300. In FIGS. 2A-2B, at least a first slot 314A and a second slot 314B are arranged on different sides of a centre axis A of the energy storage or transformation device 300. The energy storage or transformation device 300 further comprises an inducible gas-cushion arrangement 320 comprising an inlet connection 321 connectable to a gas supply, e.g. an air supply, a first skirt 322A arranged in the first slot 314A and second skirt 322B arranged in the second slot 314B. In FIG. 2A, the first and second skirts 322A, 322B are housed in the first and second slots 314A, 314B, respectively. The inducible gas-cushion arrangement 320 further comprises a conduit system 330 configured to transfer gas from the gas supply via the inlet connection 321 to the first and second skirts 322A, 322B in the first and second slots 314A, 314B, respectively. As seen in FIGS. 2A-2B, the inducible gas-cushion arrangement 320 is integrated into the energy storage or transformation device 300. The conduit system 330 may be arranged internally or externally of the outer casing 310.

The inducible gas-cushion arrangement 320 is arrangeable in an active and an inactive state. In the inactive state, shown in FIG. 2A, the inducible gas-cushion arrangement 320 does not cause the underside 312 of the energy storage or transformation device 300 to lose contact with the ground surface 301. In other words, the inducible gas-cushion arrangement 320, in its inactive state, allows or causes the underside 312 of the energy storage or transformation device 300 to be in contact with the ground surface 301. That is, in the inactive state, no gas is supplied to the inducible gas-cushion arrangement 320 via the inlet connection 321, or alternatively, not enough gas is supplied to the inducible gas-cushion arrangement 320 to form a gas-cushion in the first and second slots 314A, 314B causing the underside 312 of the energy storage or transformation device 300 to lose contact with the ground surface 301.

In the active state of the inducible gas-cushion arrangement 320, shown in FIG. 2B, enough gas is supplied to the inlet connection 321 (and further supplied via the conduit system 330) to form gas cushions 324 between the underside 312 and the ground surface 301, thus generating a lifting force causing the underside 312 of the energy storage or transformation device 300 to lose contact with the ground surface 301. In more detail, gas is supplied via the conduit system 330 to the first slot 314A, whereby the first skirt 322A is unfolded, and forms a first gas-cushion 324A. Correspondingly, gas is supplied via the conduit system 330 to the second slot 314B, whereby the second skirt 322B is unfolded, and forms a second gas-cushion 324B. The combined effect of the gas-cushions 324 is a generated lifting force causing the underside 312 to lose contact with the ground surface 301. Hereby, movement, such as e.g. a sliding movement along the ground surface 301, of the energy storage or transformation device 300 is facilitated.

It should be noted that the first and second skirts 322A, 322B may be attached to an inner structure of the first and second slots 314A, 314B, respectively. According to at least one example embodiment, the first and second skirts 322A, 322B are omitted. Thus, the inducible gas-cushion arrangement 320 may be arranged and configured to generate the lifting force causing the underside 312 of the energy storage or transformation device 300 to lose contact with the ground surface 301 without the first and second skirts 322A, 322B, by providing enough gas to first and second slots 314A, 314B, and/or adapting the sizes of the first and second slots 314A, 314B accordingly.

The energy storage or transformation device 300, being a heavy object, is typically in need of careful handling upon movement of the energy storage or transformation device 300 into a confined space, such as e.g. installation of the energy storage or transformation device 300 into the container or compartment 15 of vehicle 1 of FIG. 1. Such method of moving the energy storage or transformation device 300 will now be described with reference to FIGS. 3-4.

Figure 3:
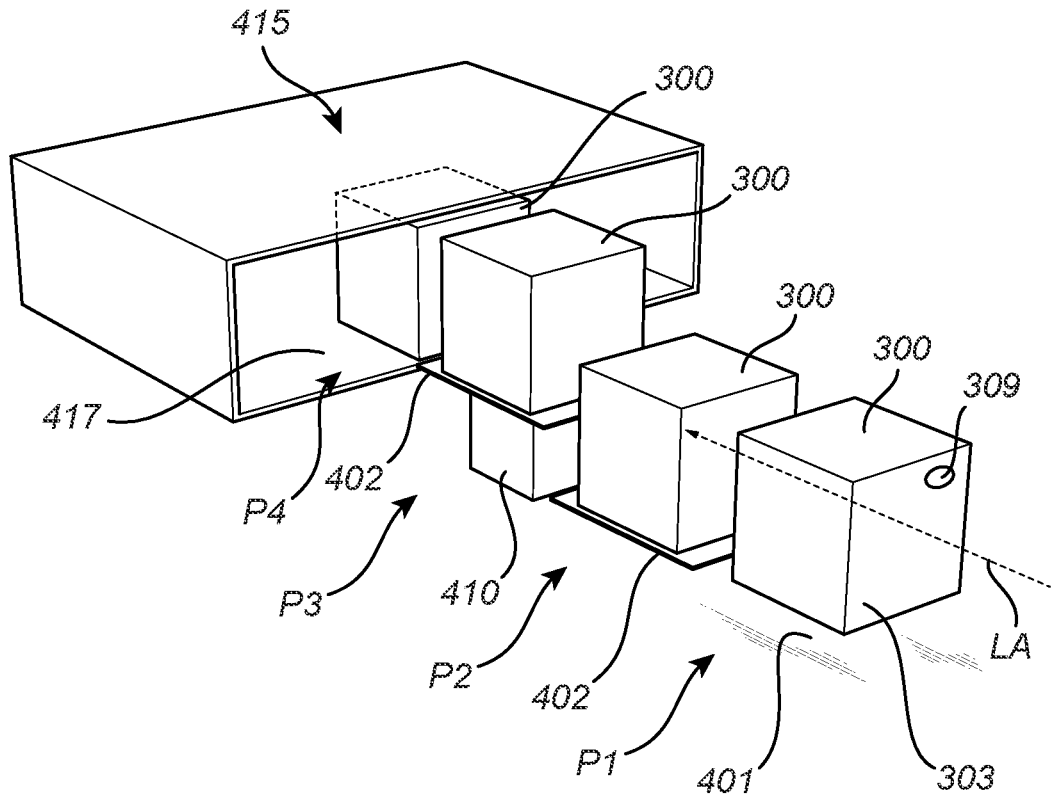
FIG. 3 is a perspective view of a heavy object being moved into a confined space utilizing the inducible gas-cushion arrangement in accordance with an example embodiment of the invention.
Figure 4:
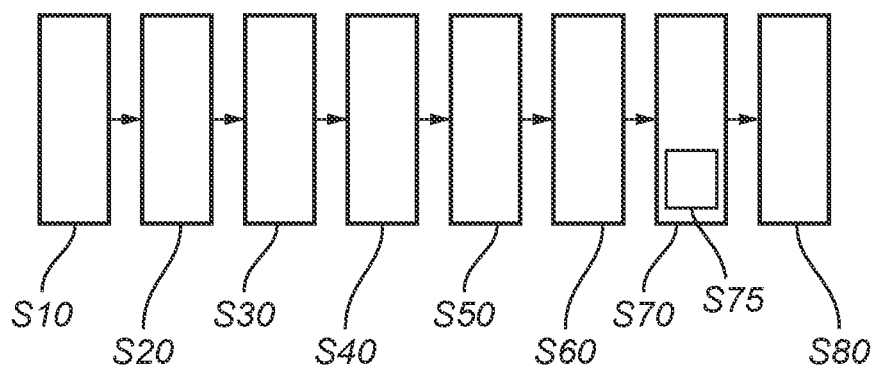
FIG. 4 is a flowchart illustrating steps of method in accordance with example embodiments of the invention.

FIG. 3 discloses the energy storage or transformation device 300 of FIG. 2, and its movements from an initial position P1 to a final position P4 inside a confined space 415, and FIG. 4 is a flow-chart describing the steps of the method to move the energy storage or transformation device 300. For enhanced visibility of FIG. 3, some reference numerals of the energy storage or transformation device 300 are not indicated again, but reference is made to FIG. 2. The confined space 415 is at least partly defined by a supporting surface 417 for supporting the energy storage or transformation device 300 in its final position P4. The confined space 415 is for example the confined space of the container 15 of vehicle 1 of FIG. 1, e.g. a box, such as a box for housing batteries or fuel cells in a vehicle.

In a step S10, being e.g. a first step S10, the energy storage or transformation device 300 is provided in the initial position P1. In the initial position P1 the underside 312 of the energy storage or transformation device 300 is resting on a first ground surface 401, and the inducible gas-cushion arrangement 320 is in its inactive state not to cause the underside 312 to lose contact with the first ground surface 401.

In a step S20, being e.g. a second step S20, the inducible gas-cushion arrangement 320 is activated, i.e. brought into its active state, by forming gas cushions 324 between the underside 312 of the energy storage or transformation device 300 and the first ground surface 401, the gas cushions 324 generating a lifting force causing the underside 312 to lose contact with the first ground surface 401, as has been correspondingly described with reference to FIG. 2.

In a step S30, being e.g. a third step S30, the energy storage or transformation device 300 is moved utilizing the lifting force of the gas-cushions 324 from the initial position P1 to a second position P2. The movement in step S30 is typically carried out by a horizontal movement, i.e. a movement along a longitudinal direction of the energy storage or transformation device 300. Thus, the energy storage or transformation device 300 is moved from a first horizontal position in the first position P1, to a second horizontal position in the second position P2, the two horizontal positions being different to each other. In FIG. 3, the energy storage or transformation device 300 is horizontally moved by sliding it onto a second ground surface 402, the second ground surface 402 being vertically aligned with the first ground surface 401. For example, the energy storage or transformation device 300 is pushed from the initial position P1 to the second position P2 by hand. Thus, at least initially in the second position P2, the underside 312 is not in contact with the second ground surface 402 owing to the lifting force of the gas cushions 324.

In FIG. 3, the second ground surface 402 is forming part of a lifting arrangement 410 being configured to vertically move the energy storage or transformation device 300. For example, the lifting arrangement 410 is configured to vertically move the energy storage or transformation device 300 by a vertical distance of at least 50% of the height of the energy storage or transformation device 300, i.e. substantially more than any vertical movement caused by the inducible gas-cushion arrangement 320.

In a step S40, being e.g. a fourth step S40, the inducible gas-cushion arrangement 320 is brought into its inactive state, e.g. by stopping, or at least reducing, the supplied gas to the inlet connection 321. Hereby, the underside 312 will be brought into contact with the second ground surface 402.

In a step S50, being e.g. a fifth step S50, the energy storage or transformation device 300 is vertically moved relative the confined space 415 from the second position P2 to a third position P3, in which the underside 312 of the energy storage or transformation device 300 at least levels with the supporting surface 417 of the confined space 415. Thus, the energy storage or transformation device 300 is moved from a first vertical position/level in the second position P2, to a second vertical position/level in the third position P3, the two vertical positions/levels being different to each other. During step S50, the inducible gas-cushion arrangement 320 is preferably kept in its inactive state for increased stability during the movement.

In a step S60, being e.g. a sixth step S60, the inducible gas-cushion arrangement 320 is activated, i.e. brought into its active state, by forming gas cushions 324 between the underside 312 of the energy storage or transformation device 300 and the second ground surface 402 (i.e. in the second vertical position/level), the gas cushions 324 generating a lifting force causing the underside 312 to lose contact with the second ground surface 402.

In a step S70, being e.g. a seventh step S70, the energy storage or transformation device 300 is horizontally moved utilizing the lifting force of the gas-cushions 324 from the third position P3 to the final position P4 inside the confined space 415. Thus, the energy storage or transformation device 300 is moved from the second horizontal position in the third position P3 (the horizontal position of the energy storage and transformation device 300 in FIG. 3 being the same in the second and third positions P2, P3), to a third horizontal position in the final position P4, the two horizontal positions being different to each other. In FIG. 3, the energy storage or transformation device 300 is horizontally moved by sliding it onto the supporting surface 417 of the confined space 415. For example, the energy storage or transformation device 300 is pushed from the third position P3 to the final position P4 by hand. Thus, at least initially in the final position P4, the underside 312 is not in contact with the supporting surface 417 owing to the lifting force of the gas cushions 324.

In a step S80, being e.g. an eight step S80, the inducible gas-cushion arrangement 320 is brought into its inactive state, e.g. by stopping, or at least reducing, the supplied gas to the inlet connection 321. Hereby, the underside 312 will be brought into contact with the supporting surface 417.

The energy storage or transformation device 300 is in FIG. 3 box-shaped, or has a rectangular shape, comprising at least a front side 303 and a parallel back side arranged along a longitudinal axis LA of the energy storage or transformation device 300. As shown in FIG. 3, the front side 303 may comprise an interface 309 for connectively possibilities (e.g. electrical). Thus, the inducible gas-cushion arrangement 320 is configured to enable movement of the energy storage or transformation device 300 in a direction at least along the longitudinal axis. Hereby, the front side 303 with the interface 309 for connectively possibilities may be desirably arranged inside the confined space 415. The interface 309 may as well be arranged on the back side of the energy storage or transformation device 300.

Figure 5:
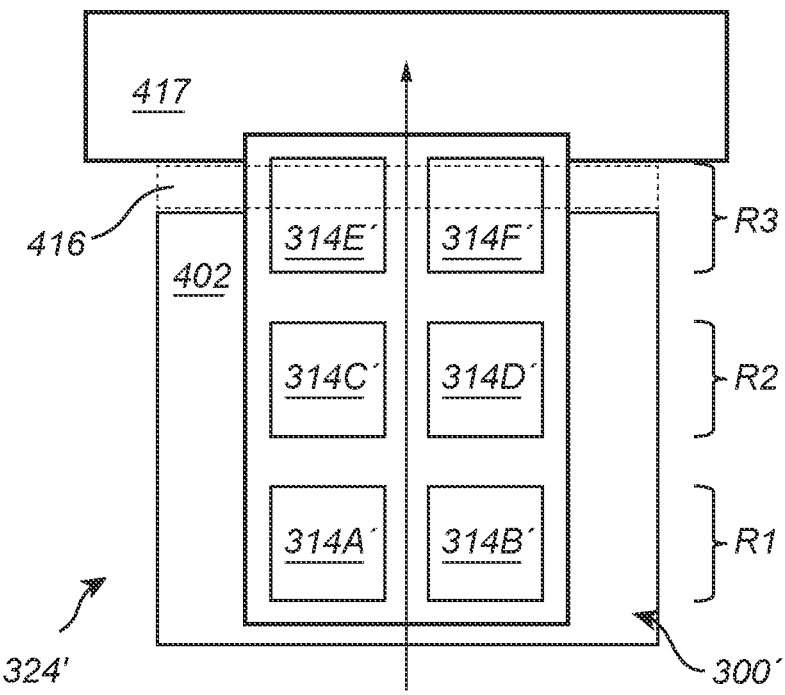
FIG. 5 is a schematic cross-sectional detailed view of heavy object in accordance with an example embodiment of the invention.

As the energy storage or transformation device 300 is moved from the third position P3 to the final position P4 in step S70, and thus is moved or slided from the second ground surface 402 to the supporting surface 417, the energy storage or transformation device 300 will typically cross a gap existing between the second ground surface 402 and the supporting surface 417 (i.e. in FIG. 3, a gap between the lifting arrangement 410 and the confined space 415). In order to be able to keep the lifting forced intact, or at least functional, during movement over the gap, so that the underside 312 is not brought into contact with the second ground surface 402 and/or the supporting surface 417 before reaching the final position P4, the inducible gas-cushion arrangement 320 is preferably arranged so as to form a plurality of separate gas-cushion segments between the underside 312 and the ground surface or supporting surface. FIG. 5 is a cross-sectional view of a portion of an example energy storage or transformation device 300', which e.g. may be the same energy storage or transformation device 300 as that of FIGS. 2A-2B and FIG. 3, during movement over a gap 416, in which the first and second slots 314A', 314B' (corresponding to the first and second slots 314A, 314B of the energy storage or transformation device 300 of FIGS. 2A-2B) are shown as a first pair of slots arranged in a first row R1. The energy storage or transformation device 300' of FIG. 5 further comprises an inlet connection and a conduit system, corresponding to the respective inlet connection 321 and a conduit system 330 of the energy storage or transformation device 300 of FIGS. 2A-2B.

The energy storage or transformation device 300' of FIG. 5 further comprises third and fourth slots 314C', 314D' arranged as a second pair of slots in a second row R2, and fifth and sixth slots 314E', 314F', arranged as a third pair of slots in a third row R3. Each one of the slots 314A'-314F' comprises a skirt (not shown) correspondingly to the first and second skirts 322A, 322B in the first and second slots 314A, 314B, of FIGS. 2A-2B, as well as a gas connection to the inlet connection via the conduit system. By the arrangement in FIG. 5, a separate gas-cushion in each of the slots 314A'-314F' will be formed in the active state of the inducible gas-cushion arrangement, each of the separate gas-cushions generating a individual lifting force, wherein the sum of active gas-cushions form an overall lifting force of the energy storage or transformation device 300'. Thus, the energy storage or transformation device 300' may be moved over the gap 416 with the overall lifting force sustained, at least in order to bridge the gap 416, even if one or more of the gas-cushions are temporarily not contributing to the overall lifting force due to coincidence with the gap 416. For example, in FIG. 5, the induced gas-cushions in the fifth and sixth slots 314E', 314F' (R3) will not contribute to the overall lifting force as they are temporarily coinciding with the gap 416 (i.e. being temporarily inoperable), and any gas supplied to the fifth and sixth slots 314E', 314F' will be further transported into the gap 416 without the build-up of any gas-cushions. However, the separated gas-cushions induced in the first to fourth slots, 314A'-314D' (R1, R2), will provide an overall lifting force enabling the underside of the energy storage or transformation device 300' not to be brought into contact with the second ground surface 402 or supporting surface 417. Moreover, as the energy storage or transformation device 300' is moved further into the confined space 415 as indicated by the arrow, the fifth and sixth slots 314E', 314F' will again be able to form separate gas-cushions generating respective individual lifting forces, as they will be arranged above the supporting surface 417. Thus, the induced lifting force of the generated gas-cushions in the fifth and sixth slots 314E', 314F' will contribute to the overall lifting force as another one of the pair of slots R1, R2 coincides with gap 416, enabling the overall lifting force so that the underside of the energy storage or transformation device 300' is not brought into contact with the second ground surface 402 or supporting surface 417.

Thus, briefly turning back to FIG. 4, the method may comprise a step S75, preferably being a sub-step to step S70, of moving the energy storage or transformation device 300, 300' by sliding it over a gap 416, whereby the separate gas-cushion segments enable the overall lifting force of the inducible gas-cushion arrangement to be sustained.

Figure 6:
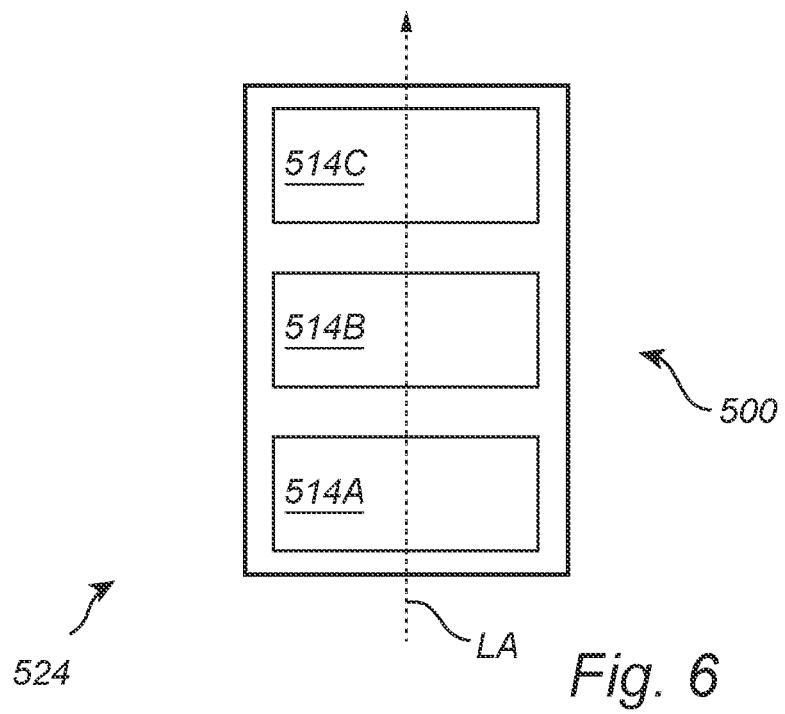
FIG. 6 is a schematic cross-sectional detailed view of heavy object in accordance with yet an example embodiment of the invention.

FIG. 6 discloses an alternative embodiment of the energy storage or transformation device 300' of FIG. 5. The energy storage or transformation device 500 of FIG. 6 comprises a first slot 514A, a second slot 514B and a third slot 514C. The energy storage or transformation device 500 further comprises an inlet connection and a conduit system, corresponding to the respective inlet connection 321 and a conduit system 330 of the energy storage or transformation device 300 of FIGS. 2A-2B. Each one of the slots 514A-514C 514C comprises a skirt (not shown) correspondingly to the first and second skirts 322A, 322B in the first and second slots 314A, 314B, of FIGS. 2A-2B, as well as a gas connection to the inlet connection via the conduit system.

Compared to the energy storage or transformation device 300' of FIG. 5, the energy storage or transformation device 500 of FIG. 6 does not agglomerate the slots 514A-514C into pairs in rows, but instead provide a slot arrangement in which the slots 514A-514C are arranged in a parallel configuration along the longitudinal axis LA of the energy storage or transformation device 500. Thus, the energy storage or transformation device 500 may, correspondingly to the energy storage or transformation device 300' of FIG. 5, be moved over a gap 416 with the overall lifting force sustained, at least in order to bridge the gap 416. In FIGS. 5-6 the gas cushions 324', 524 or gas cushion segments 324', 524 are coinciding with slots 314A'-314E', 514A-514C, and are generally indicated by single reference numeral.

The number of slots and gas-cushions shown in the FIGS. 5 and 6 are exemplifying. It should be realized that there may be more slots and gas-cushions, but also fewer. However, all slots and gas-cushions are members of a common collaborative group, i.e. a group collaborating in performing the overall lifting force causing the underside of the energy storage or transformation device to lose contact with the ground surface (with the exception of any slot or gas-cushion being temporarily inoperable due to e.g. coincidence with a gap). Thus, the number of slots and gas-cushions of the energy storage or transformation devices may vary, and may be provided in various arrangements. For example, the slots may be separated in various ways along the longitudinal axis of the energy storage or transformation device, to enable the energy storage or transformation device to be moved over a gap with the overall lifting force sustained, at least in order to bridge the gap. For example, the inducible gas-cushion arrangement is configured and arranged to bridge a gap of less than 40%, e.g. between 1% and 40%, of the extension of the energy storage or transformation device along the longitudinal axis, such as less than 30%, or less than 20%, or less than 10% or less than 5% of the extension of the energy storage or transformation device along the longitudinal axis, e.g. between 1% and 30%, or between 1% and 20%, or between 1% and 10%, or between 1% and 5%.

Typically, the energy storage or transformation device 300, 300', 500 comprises energy storage or transformation means, such as e.g. battery cells for embodiments in which the energy storage or transformation device is a battery, gas tank comprising gas for embodiments in which the energy storage or transformation device is a gas tank, separate fuel cell units for embodiments in which the energy storage or transformation device is a fuel cell.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. The steps of any method disclosed herein do not have to be performed in the exact order disclosed, but may so according to at least one example embodiment.

The invention claimed is:
1. A method for moving a heavy object, comprising:
providing a heavy object in an initial position, the heavy object having an underside resting on a ground surface and comprising an inducible gas-cushion arrangement which in an inactive state causes the underside of the heavy object to maintain contact with the ground surface;
activating the inducible gas-cushion arrangement by forming a gas cushion between the underside of the heavy object and the ground surface, the gas cushion generating a lifting force causing the underside of the heavy object to lose contact with the ground surface;
moving the heavy object relative to a confined space until the underside of the heavy object is at least level with the supporting surface of the confined space, the confined space being at least partially defined by the supporting surface for supporting the heavy objecting in a final position; and moving the heavy object into the final position in the confined space and onto the supporting surface of the confined space, utilizing the lifting force of the gas-cushion.

2. The method of claim 1, wherein moving the heavy object relative to the confined space comprises vertically moving the heavy object from a first vertical position to a second vertical position.

3. The method of claim 2, wherein the inducible gas-cushion arrangement is kept, or brought, into the inactivate state during vertically moving the heavy object from the first vertical position to the second vertical position.

4. The method of claim 1, wherein moving the heavy object into the confined space comprises horizontally moving the heavy object from a horizontal position to another horizontal position.

5. The method of claim 1, comprising bringing the inducible gas-cushion arrangement to the inactive state subsequent to moving the heavy object into the final position in the confined space, thereby causing the underside of the heavy object to gain contact with the supporting surface in the confined space.

6. The method of claim 1, wherein the inducible gas-cushion arrangement is arranged and configured to, when activated, form a plurality of separate gas-cushion segments, the method further comprising moving the heavy object over a gap whereby a sub-set of the separate gas-cushion segments maintains the overall lifting force induced by the inducible gas-cushion arrangement.

7. The method of claim 1, wherein the inducible gas-cushion arrangement is integrated in the heavy object.

8. The method of claim 1, wherein the confined space is an inner housing space of a container.

9. A heavy object in the form of an energy storage or transformation device comprising:
an underside configured to rest on a ground surface; and
an inducible gas-cushion arrangement integrated in the heavy object and being arrangeable in an active state and an inactive state, wherein the inducible gas-cushion arrangement in the inactive state causes the underside of the heavy object to maintain contact with the ground surface, and in the active state forms a gas cushion between the underside of the heavy object and the ground surface, thus generating a lifting force causing the underside of the heavy object to lose contact with the ground surface.

10. The heavy object of claim 9, wherein the inducible gas-cushion arrangement is arranged and configured to, in its active state, form a plurality of separate gas-cushion segments.

11. The heavy object of claim 9, comprising at least a front side and a back side arranged along a longitudinal axis of the heavy object, and comprising an interface having connectively possibilities integrated in the front side and/or back side, wherein the inducible gas-cushion arrangement is arranged and configured to, in the active state, enable movement of the heavy object in a direction along the longitudinal axis.

12. The heavy object of claim 10, wherein the separate gas-cushion segments, when the inducible gas-cushion arrangement is in the active state, are arranged in a parallel configuration along the longitudinal axis of the heavy object.

13. A vehicle comprising a plurality of heavy objects in the form of energy storage or transformation devices according to claim 9, and a container for housing the heavy objects in the form of energy storage or transformation devices.

* * * * *